Jan. 22, 1929.

F. L. SEARS

STORAGE BATTERY

Filed March 3, 1927

1,699,633

INVENTOR.
F. L. Sears
BY
ATTORNEYS

Patented Jan. 22, 1929.

1,699,633

UNITED STATES PATENT OFFICE.

FRED L. SEARS, OF NICHOLASVILLE, KENTUCKY.

STORAGE BATTERY.

Application filed March 3, 1927. Serial No. 172,434.

This invention relates to storage batteries of the type provided with a hydrometer for measuring the quantity and the character of the electrolyte.

The object of this invention is to provide a series of built-in hydrometers and glasses therefor in connection with the type of composition battery boxes which do not employ an exterior casing.

Another object of the invention is to form, during the molding process of the composition box, a series of vertical openings formed in one of the walls of the box, adjacent each of the cells therefor, for the reception of a series of glass tubes containing hydrometers, which are visible from the exterior to determine the quantity and condition of the electrolyte in the cells.

Another object of the invention is to so mold one wall of the box as to protect the glass tubes placed in the openings aforesaid.

Another object of the invention is to form a series of screw threads in the upper portions of each of said vertical openings in the wall of the box receiving the hydrometers for the purpose of receiving plugs, after the glasses have been vertically inserted in said openings, to thereby prevent leakage of the electrolyte and to permit ready replaceability of the hydrometer glasses when desired.

Still another object of the invention is to provide the exterior face of the wall of the composition box receiving the hydrometers with diverging or beveled portions to thereby retain the glass tubes securely in place while permitting an inspection of the glass tubes through the slot defined by such beveled portions.

Figure 1:
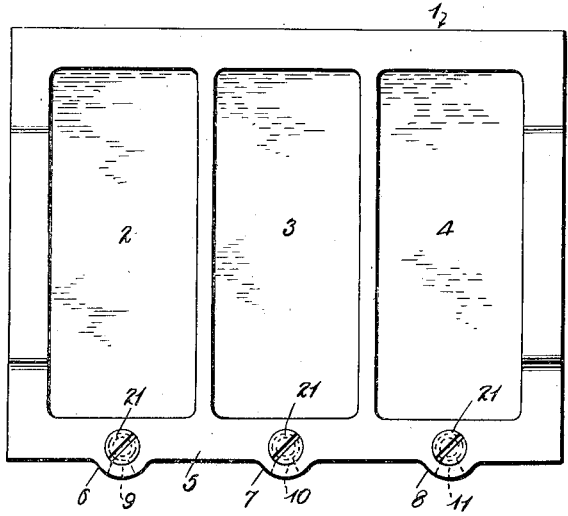

Other and more specific objects of the invention will be apparent from the reading of the specification in conjunction with the drawings attached hereto and forming a part hereof, wherein Figure 1 represents a plan view of my invention as applied to a well known type of storage battery.

Figure 2:
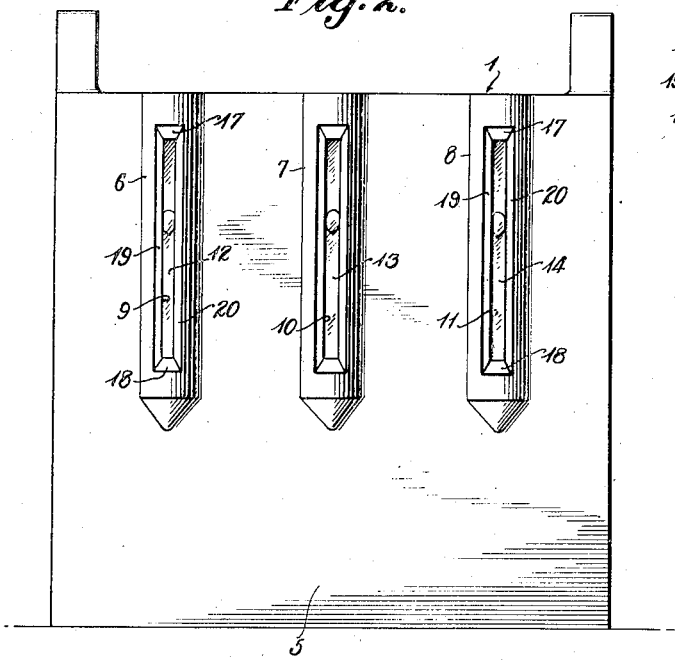

Figure 2 discloses a vertical view of the invention.

Figure 3:
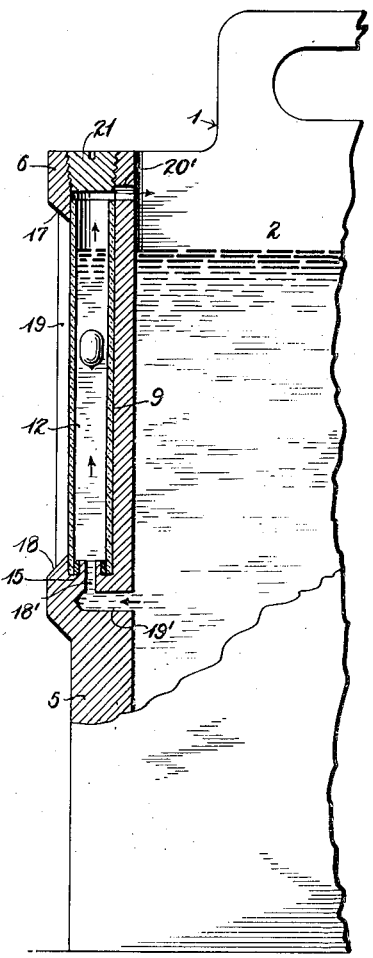

Figure 3 is a cross section of my device illustrating the mode of operation.

Referring now specifically to the drawings wherein like reference characters indicate like parts, 1 indicates a battery box of the composition type employing but a single casing, as distinguished from the so-called "knock-down" type necessitating the use of an exterior casing. In the drawings shown, there are three cells provided as indicated by reference numerals 2, 3 and 4.

The wall 5 of this box is provided with a series of enlargements 6, 7 and 8. During the process of molding the composition box there is formed a series of vertical openings 9, 10 and 11 for the reception of a corresponding number of glass tubes 12, 13 and 14. It will be observed that these openings are placed opposite the enlarged portions of the wall 6, 7 and 8. At the bottom of these vertical openings is provided a nipple-like projection 15 for the reception of the lower extremities of the glass tubes. The exterior surface of the wall portion 5 of the box is provided with a beveled cut-out portion constituting an opening 16. The exterior surface of the box is beveled as at 17, 18, 19 and 20. By virtue of this peculiar formation the glass tube and the hydrometer therefor is fully protected from the exterior and at the same time the slot afforded by the beveled portions is adequate for inspecting the condition of the hydrometer. A vertical passageway 18 communicates with the lateral port 19 to the interior of the cell of the storage battery, and through this port and passageway the electrolyte passes upwardly through the glass tube. At the upper portion of the box there is provided a second lateral passageway 20. At the upper portion of the vertical openings there is provided a series of screw threaded openings for the reception of a closure 21. In assembling the hydrometers, a small portion of cement is placed around the nipple 15 after which the glass is vertically introduced through the threaded portion of the vertical openings and the lower portion of the glass is retained from movement by the cement. Thereafter the screw threaded plugs 21 are applied. In the event of breakage of the tubes, it is possible to readily remove the same by merely unscrewing the plug and lifting the broken tube from the openings.

While I have shown the preferred form of construction in the drawings attached hereto, yet it will be obvious to those skilled in the art that many changes in constructions and arrangement of parts may be made in keeping with the scope of the following claims.

Having thus described my invention, what I claim is:

1. A composition storage battery box provided with a plurality of cells, one of the walls of said box being provided with a series of vertical openings for the reception of hydrometer tubes, the upper portions of said vertical openings being adapted to screw threadedly receive a closure to prevent escape of the electrolyte and to permit ready removability of the hydrometer tubes, means for establishing a communication with said cells and tubes, said storage battery wall being provided with enlargements at the places therein receiving the glass tubes, said enlargements protecting the glass tubes from injury, and a plurality of exterior slots in said wall for permitting inspection of the quantity and condition of the electrolyte within said hydrometer tubes.

2. In combination, a storage battery composition box having formed in one wall thereof a plurality of vertical openings, said openings being adapted to receive hydrometer tubes, upstanding nipples at the lower extremity of said openings for receiving the lower ends of said glass tubes, means for establishing communication with said glass tubes, said means comprising a lower lateral port and a vertical port extending through said nipple, and an upper lateral port communicating with the cell and the upper portion of said glass tube.

3. In combination, a storage battery box having a plurality of cells therein a plurality of outwardly projecting enlarged portions in at least one of the walls of said storage battery, a series of vertical openings in said walls adjacent said enlarged portions, a series of ports for establishing communication with the cells of the storage battery box and the upper and lower end portions of said openings, the outer face of the wall of each enlarged portion having a restricted observation slot extending substantially the full length of the enlargement, and a glass tube in each opening extending beyond the ends of the slots and between the ports to close the slots and establish sealed communication between said ports.

In testimony whereof I affix my signature.

FRED L. SEARS.